United States Patent Office 3,486,314
Patented Dec. 30, 1969

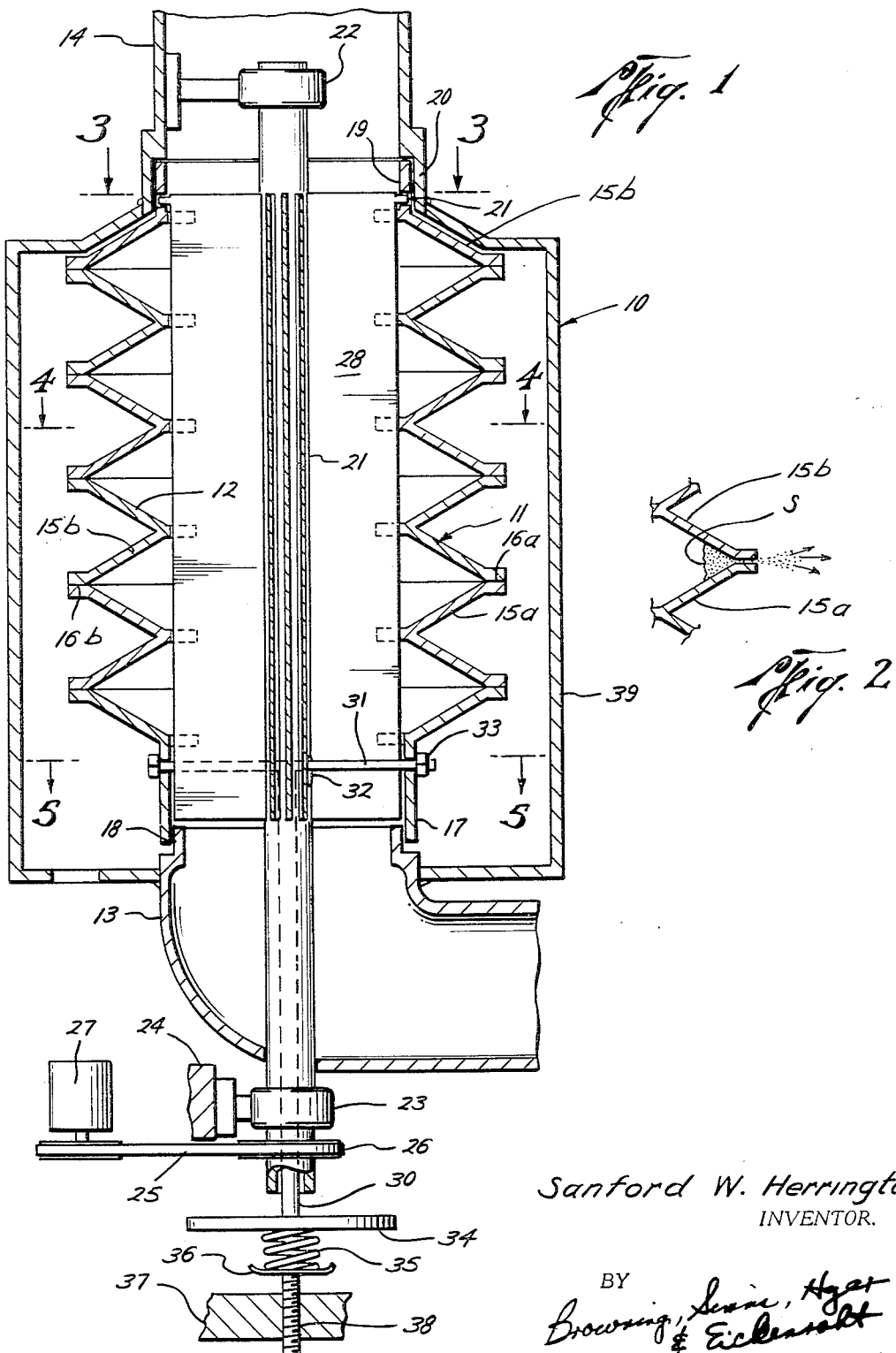

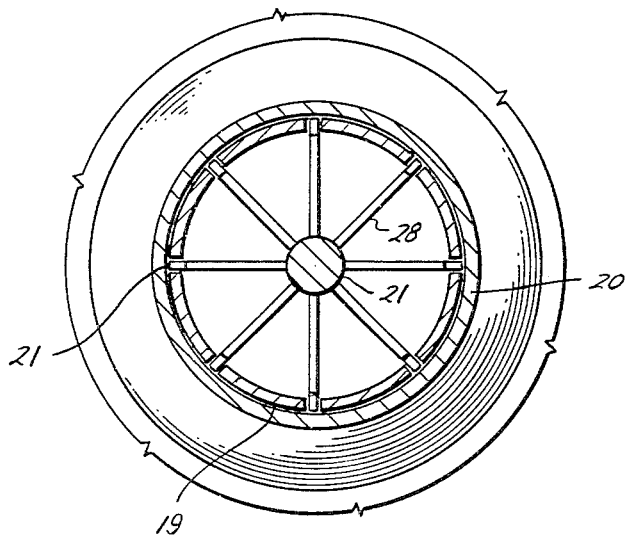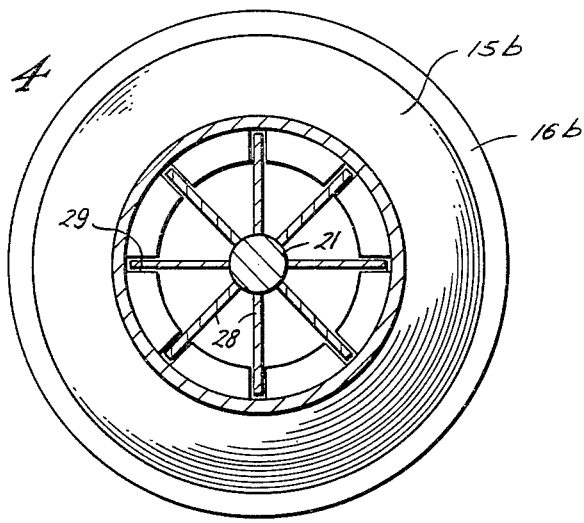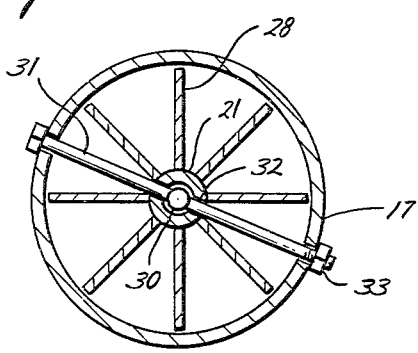

3,486,314
SEPARATOR
Sanford W. Herrington, 606 Roddey St.,
Clute, Tex. 77531
Filed Feb. 15, 1967, Ser. No. 616,229
Int. Cl. B01d 53/00, 46/00
U.S. Cl. 55—408                    8 Claims

ABSTRACT OF THE DISCLOSURE

A separator in which a passageway through a chamber having an inlet at one end and an outlet at the other is made up of opposed, dish-shaped walls having their centers removed and arranged coaxially of one another to form a succession of apices therebetween. A rotatable shaft having fins on it extends longitudinally within the passageway, and the chamber walls are connected to the fins for rotation with them and longitudinal movement relative thereto. The inner edges of adjacent walls are joined to one another, and the outer edges are urged into engagement with one another by a yieldable spring, but are free to move axially away from one another to form openings between them.

BRIEF SUMMARY OF THE INVENTION

This invention relates to improved apparatus for separating liquids or solids from air or other gases for the purpose of recovering the liquids or solids or cleaning the air or other gases, or both. It may be used, for example, in separating dust or entrained liquid particles from the air in which they are carried.

The primary object of this invention is to provide a simple, inexpensive and highly efficient separator which does not require cleaning and which thus eliminates down time.

A more particular object is to provide a separator which is self-cleaning in the sense that it automatically discharges accumulations of the separated liquid or solid from the interior thereof during its normal operation.

A still further object is to provide such a separator which is constructed of a small number of parts requiring a minimum of replacement and repair.

These and other objects are accomplished, in accordance with the illustrated embodiment of this invention, by a separator which comprises a chamber having a passageway through it with an inlet in one end and an outlet at the other end, and a rotatable shaft extending longitudinally within the chamber having longitudinal fins arranged about it. The chamber includes at least one pair of angularly disposed walls which converge outwardly from the passageway to form an apex therebetween. The shaft and the chamber walls are rotated at a speed which forces liquids or solids in the fluid passing through the passageway into the apex between the chamber walls to separate them from the gas in the fluid and cause them to accumulate therein as the cleaned gas flows through the outlet.

The outer edges of the walls are normally engaged with one another to close the apex and thereby prevent the release of the accumulated solids or liquids. However, these edges are caused to move apart from time to time, preferably due solely to the centrifugal force on the solids or liquids accumulated in the apex, so as to release such accumulation through the opening therebetween. Then, upon such release, these edges are moved back into engagement to again prevent the release of additional liquids or solids accumulated in the apex.

In the preferred embodiment of the invention, there are a plurality of pairs of such walls arranged in series longitudinally of the passageway so as to increase its capacity. More particularly, the inner edge of one wall of each pair is joined to the inner edge of one wall of an adjacent pair so as to form a succession of apices along the passageway. Also, the walls of the chamber are preferably connected to the fins for rotation therewith, whereby both the fins and the walls may be rotated by a prime mover for the shaft.

BRIEF DESCRIPTION OF THE DRAWINGS

In the drawings, wherein like reference characters are used throughout to designate like parts:

FIG. 1 is a longitudinal sectional view of a separator constructed in accordance with the present invention;

FIG. 2 is a detailed sectional view of a pair of the converging walls of the chamber of the separator, with the outer edges thereof forced apart by the accumulation of solid particles in the apex therebetween;

FIG. 3 is a cross sectional view of the separator, as seen along broken line 3—3 of FIG. 1;

FIG. 4 is another sectional view of the separator, as seen along broken line 4—4 of FIG. 1; and FIG. 5 is a still further cross sectional view of the separator, as seen along broken line 5—5 of FIG. 1.

DETAILED DESCRIPTION OF THE DRAWINGS

With reference now to the details of the abovedescribed drawings, the overall separator, which is indicated in its entirety by reference character 10, includes a chamber 11 having a passageway 12 therethrough with an inlet 13 in one end and an outlet 14 at the other end. In the use of the separator, the fluid in which the solids or liquids are carried is forced by any suitable means (not shown) through the inlet 13 into the chamber passageway 12 where such solids or liquids are separated, and the cleaned gas flows through the outlet 14 which connects with the atmosphere or some other place of disposal.

As also shown in FIG. 1, the chamber 13 comprises a plurality of pairs of angularly disposed walls 15a and 15b which converge outwardly from the passageway 12 to form an apex therebetween. As previously mentioned, and as will be described more fully hereinafter, the outer edges 16a and 16b of these walls are normally engaged to close the apex, but are movable apart to release solids or liquids accumulated in the apex, as indicated by the solid particles S and the arrows shown in FIG. 2.

As also previously mentioned, the pairs of walls 15a and 15b are arranged in series longitudinally of the passageway. Thus, the chamber is made up of a succession of apices in which the solids or liquids may be accumulated so as to multiply the capacity of the separator. More particularly, the inner edge of one wall of each pair is joined to the inner edge of one wall of an adjacent pair of walls.

As shown in FIG. 1, each of the walls 15a and 15b takes the shape of a dish having its center removed. More particularly, these identical dish-shaped walls 15a and 15b are arranged coaxially and with their concave surfaces opposed to one another. Geometrically speaking, each of the walls 15a and 15b has a frusto-conical base with a rim or lip thereabout to form the outer edges, and the wall base extends at an acute angle with respect to a plane perpendicular to the longitudinal axis of the passageway through the chamber. Thus, it will be understood that the angular extent of the apex between the walls is twice this angular disposition of each wall with respect to the perpendicular plane.

The rims of each of the walls extend perpendicularly to the axis of the chamber passageway so as to provide each outer edge with an annular seating surface. Then, when the walls move apart, as shown in FIG. 2, these edges move apart to form an annular throat between them through which the solids or liquids are released. The inner edges of the adjacent walls may be joined in any suitable manner, as by bolting or the like, or they may be integral with one another.

The lowermost wall 15a has a skirt 17 depending therefrom which fits over an upstanding flange 18 formed on the upper end of inlet 13, and there is also a skirt 19 extending upwardly from the uppermost wall 15b for fitting closely within a depending flange 20 on the lower end of the outlet 14. Thus, with the inlet and outlet 13 and 14, respectively, fixedly mounted in any suitable manner, the chamber 11 is held therebetween for axial expansion and contraction, as will be described. More particularly, the longitudinal extent of the chamber 11 with the apices closed, as shown in FIG. 1, is somewhat shorter than the longitudinal space provided between shoulders on the inlet and outlet adjacent the flanges 18 and 20. Thus, as will be explained, the outer edges of the walls are free to move apart to open the apices, and thus expand the chamber in a longitudinal direction.

A shaft 21 extends coaxially through the separator chamber 12 and is supported at its opposite ends by means of thrust bearings 22 and 23 above and below the chamber. As shown in FIG. 1, the upper bearing 22 may be supported from the inner side of outlet 14, and the lower bearing 23 may be supported from a base 24 beneath the bend in the inlet 13. The shaft is rotated at a desired speed by means of a belt 25 about a pulley 26 beneath the bearing 23 and driven by a motor 27.

A plurality of longitudinal fins 28 are mounted on and radiate from the shaft 21. More particularly, the outer edges of these fins extend to the passageway through the chamber so as to influence at least substantially the entire flow of fluid passing into the passageway from the inlet 13. Thus, as will be understood, the liquids or solids in this fluid are forced radially outwardly by the rotating fins into the apices formed between the chamber walls 15a and 15b.

In some cases, the fins may be found to impose an objectionable back pressure on the inlet. In such an event, scoops (not shown) may extends angularly from the lower ends of the fins 28 and in the direction of rotation of shaft 21. This, of course, creates a low pressure zone at the inlet for lessening this back pressure.

As previously mentioned, the walls of the chamber are preferably connected to the fins so as to rotate therewith, whereby both the fins and the walls are rotated by the single prime motor 27. For this purpose, and as illustrated in FIGS. 1 and 2, the inner edges of the chamber walls extend into the passageway and are notched at 29 (see FIG. 4) so as to closely receive the outer ends of the fins. This provides a guide and slide structure forming a rotary driving means for the walls so that they are rotated in the same direction as the fins, while by the orientation of the guide and slide the walls are mounted to permit an axial movement relative to one another and to the shaft and fins. As will be appreciated, this not only causes the chamber walls to be rotated with the fins, but at the same time permits the chamber walls to move longitudinally relatively to the fins as the chamber expands and retracts.

As shown in FIGS. 1 and 3, the upwardly extending skirt 19 on the uppermost wall 15b is provided with a series of holes which receive pins 21 extending out from the upper edge of the fins 28. In this way, the upper end of the walls forming the chamber 11 are supported from the shaft, which, as previously described, is fixedly supported in a longitudial direction.

As previously described, the outer edges 16a and 16b of each of the walls 15a and 15b, respectively, are normally engaged with one another to close the apices between the walls. More particularly, these outer edges are urged into engagement with a force which is yieldable to the centrifugal force on the accumulated liquids or solids tending to separate them, as illustrated in FIG. 2. For this purpose, the lower end of the shaft 21 is hollow to receive a rod 30 having a crossbar 31 toward its upper end, which in turn extends through elongated slots 32 in the opposite sides of the shaft 21. The outer ends of the crossbar 31 extend through holes in the depending skirt 17 on the lowermost wall 15a and are secured by bolts 33 or the like.

There is a platform 34 on the lower end of the rod 30 which is urged upwardly by means of a coil spring 35, which in turn is mounted upon a plate 36 supported on a base 37. More particularly, a stem 38 extends downwardly from the plate 36 for threaded connection to the base 37, whereby the amount of force exerted by the spring 35 may be adjusted, as desired. This force, of course, urges the cross bar 31 on the rod 30 upwardly, which force is in turn transmitted to the longitudinally arranged pairs of walls 15a and 15b. Thus, the spring 35 serves to hold the outer edges of these walls in engagement with one another.

However, as solids or liquids separated from the fluid accumulate in the apices of these walls, the centrifugal force thereon resulting from the rotation of the chamber walls urges the walls away from one another and thus tends to separate the outer edges. When these combined forces on the liquids or solids accumulated in all of the apices overcome that of the spring 35, the outer edges of the walls move apart so as to release the accumulated material, after which, of course, the spring returns the outer edges into engaged positions. This expansion and contraction of the overall chamber 11 is permitted by virtue of slots 32 in the shaft 21 and the spacing of the lower end of the skirt 17 above the oppositely facing shoulder about flange 18 on the inlet 13. Of course, other means may be used to normally retain the outer edges engaged. For example, the weight of the walls alone may be sufficient when the separator is in an upright position. Also, it may be found necessary to positively move such outer edges apart at predetermined intervals, as by means of a timer. This is especially true in the separation of light solid particles whose accumulation might not be sufficient to move the edges apart.

The material which is so released from the separator chamber falls downwardly into a container 39 spaced about the chamber. This container has upper and lower walls joined to outlet 14 and inlet 13, respectively, and an opening therefrom through which the separated solids or liquids may be recovered or otherwise disposed of. In suitable cases, of course, the accumulated material may be released to the atmosphere. In any case, the important thing is that the separated liquids or solids are released from time to time from the separator during its normal operation, without the necessity of cleaning the apices or other parts within the separator in which this material accumulates.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

I claim:

1. A separator, comprising a chamber having a passageway therethrough with an inlet at one end and an outlet at the other, said chamber including a pair of angularly disposed walls which converge outwardly from the passageway to engage at their outer edges and form an apex therebetween, a shaft extending longitudinally within the chamber passageway and having longitudinal fins extending therefrom and extending continuously for substantially the length of the chamber, the spaces between adjacent fins being substantially unobstructed from one end to the other of said chamber, means for rotating the shaft and the chamber walls so as to cause liquid or solids in the fluid passing through the passageway to separate from the fluid therein and accumulate in said apex, and mounting means mounting one of said walls, including a slide and guide means oriented for axially guided sliding of said one wall for longitudinal movement relative to the other wall of said pair and to said shaft and fins, so that the outer edges of said walls may move apart to release the solids or liquids accumulated in said apex.

2. A separator as defined in claim 1, wherein each of said walls extends at an acute angle with respect to a plane perpendicular to the longitudinal axis of the passageway.

3. A separator as defined in claim 1, including means yieldably urging said walls toward one another.

4. A separator as defined in claim 1, including means connecting the fins and walls for rotation with one another.

5. A separator, comprising a chamber having a passageway therethrough with an inlet at one end and an outlet at the other, a shaft extending longitudinally within the chamber passageway and having longitudinal fins extending therefrom, said fins extending continuously for substantially the entire length of the chamber, with adjacent fins defining spaces between them which are substantially unobstructed from one end to the other of said chamber, said chamber including a series of pairs of angularly disposed walls arranged longitudinally of the passageway, the walls of each such pair converging outwardly from the passageway to engage at their outer edges and form an apex therebetween, means for rotating the shaft and the walls so as to cause liquids or solids in the fluid passing through the passageway to separate from the fluid therein and accumulate in the apices, and mounting means mounting the walls of each pair, said mounting means including slide and guide means for axially guided sliding movement of said walls, for longitudinal movement of the walls of each pair relative to one another and relative to said shaft and fins, so that the outer edge of said walls may separate and thereby release said solids or liquids accumulated in said apices.

6. A separator as defined in claim 5, wherein the inner edges of the walls are connected to the fins for rotation therewith.

7. A separator as defined in claim 6, wherein the inner edges of adjacent walls of adjacent pairs are joined to one another.

8. A separator as defined in claim 6, wherein the outer edges of the fins are parallel to the shaft axis, and the inner edges of the walls have slots which are longitudinally slidable over the outer edges of the fins.

References Cited

UNITED STATES PATENTS

| 1,339,211 | 5/1920 | McKerahan | 55—408 X |
| 1,398,598 | 11/1921 | McKee | 55—407 |

FOREIGN PATENTS

| 365,003 | 4/1906 | France. |
| 377,196 | 6/1923 | Germany. |
| 493,705 | 2/1950 | Belgium. |

HARRY B. THORNTON, Primary Examiner

U.S. Cl. X.R.

55—432